United States Patent
Weber (10) Patent No.: US 8,912,444 B2
(45) Date of Patent: Dec. 16, 2014

(54) SYSTEMS AND METHODS FOR STORING A CABLE

(75) Inventor: Trent Weber, San Francisco, CA (US)

(73) Assignee: Apple Inc., Cupertino, CA (US)

(*) Notice: Subject to any disclaimer, the term of this patent is extended or adjusted under 35 U.S.C. 154(b) by 150 days.

(21) Appl. No.: 13/598,453

(22) Filed: Aug. 29, 2012

(65) Prior Publication Data

US 2014/0060879 A1 Mar. 6, 2014

(51) Int. Cl.
| | |
|---|---|
| *H01B 7/18* | (2006.01) |
| *H01B 17/58* | (2006.01) |
| *H02G 11/00* | (2006.01) |
| *H02G 3/04* | (2006.01) |

(52) U.S. Cl.
USPC ........................................ 174/68.3

(58) Field of Classification Search
CPC ......... H02G 3/04; H02G 3/045; H02G 3/046; H02G 3/0481; H02G 3/0633; H02G 11/00; H02G 3/0418; H02G 3/0437; H02G 3/0487; H01B 7/17; H01B 7/18; H01B 7/185
USPC ........................................ 174/68.3
See application file for complete search history.

(56) References Cited

U.S. PATENT DOCUMENTS

| | | | | |
|---|---|---|---|---|
| 5,413,149 A | * | 5/1995 | Ford et al. | ..................... 138/123 |
| 6,491,067 B1 | * | 12/2002 | Davenport et al. | ........... 138/110 |
| 2006/0237216 A1 | * | 10/2006 | Yoshida et al. | ........... 174/110 R |
| 2008/0121407 A1 | * | 5/2008 | Kassab | ........................ 174/68.3 |
| 2011/0056721 A1 | * | 3/2011 | Goodman | ..................... 174/68.3 |

FOREIGN PATENT DOCUMENTS

| | | | | | |
|---|---|---|---|---|---|
| JP | | 10160965 A | * | 6/1998 | |
| JP | | 2010-74998 | * | 2/2010 | |
| JP | | 201074998 A | * | 4/2010 | ............. H02G 11/00 |

OTHER PUBLICATIONS

Curl Casing; Seiichi Kusakari; JP 2010-74998; USPTO Jul. 2014 ; translated by Phoenix Translation, 100 N. Avenue B Elgin, TX 78621.*

Bending Holding Guide of Optical Fiber Member, Optical Fiber Member with Bending Part, and its Bending Method; Asanori Inagaki, et al. ; JP 10-60965; USPTO Jul. 2014 ; translated by Schreiber Translations, Inc.*

* cited by examiner

*Primary Examiner* — Timothy Thompson
*Assistant Examiner* — Michael F McAllister
(74) *Attorney, Agent, or Firm* — Van Court & Aldridge LLP (57) ABSTRACT

Systems and methods for storing a cable are provided. The casing may be configured to naturally coil and to uncoil when one or more forces are applied to the casing. The casing may include an opening that may lead to a channel that may run longitudinally through a length of the casing. At least a portion of the cable (e.g., a headphone cable or in-ear earphone cable) may be stored in the casing by longitudinally aligning the cable with the casing, and inserting various portions of the cable through the opening and into the channel.

22 Claims, 8 Drawing Sheets

SYSTEMS AND METHODS FOR STORING A CABLE

FIELD OF THE INVENTION

This can relate to systems and methods for storing a cable, and more particularly, to systems and methods for storing a listening device using a casing.

BACKGROUND OF THE DISCLOSURE

Many listening devices broadcast music supplied from an electronic device. In particular, many headphones, in-ear earphones, and other wired listening devices include a main cable that couples to an electronic device (e.g., via an audio jack) and left and right channel cables coupled to speaker units (e.g., in-ear earbuds, headphone speakers, etc.). When the main cable is coupled to an electronic device that is supplying media (e.g., music), respective left and right channel sound may be transmitted via the main cable to the corresponding left and right channel cables and speaker units. In this manner, a user may enjoy listening to media without broadcasting the supplied media directly to the user's environment. However, one or more of the main cable and left and right channel cables may tangle and/or knot (e.g., when a user puts the listening device in a pocket or a bag), making it difficult to quickly use the listening device when desired. Such tangling and/or knotting may frustrate the user and may waste the user's time as the user attempts to untangle the listening device.

SUMMARY OF THE DISCLOSURE

Systems and methods for storing a listening device using a casing are provided.

In some embodiments, a casing may be provided for storing a cable. The casing may include a self-coiling structure having a predetermined length. The casing may include a curved outer surface, a retaining cavity, and a channel. The retaining cavity and the channel may be adjacent to each other and may extend along the predetermined length. The channel may be operative to enable the cable ingress to and egress from the retaining cavity. The casing is operative to self-coil in the absence of an externally applied force and uncoil when subjected to an externally applied force.

In some embodiments, a method may be provided for storing a cable in a casing. While an outside force is exerted on the casing, the method may include receiving the cable with a retaining cavity of the casing via a channel of the casing. When the outside force is no longer being exerted on the casing, the method may also include self-coiling the casing so that the cable, which is contained within the retaining cavity, is wrapped in a non-tangled configuration.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Systems and methods for storing a listening device using a casing are provided and described with reference to FIGS. 1-8.

Figure 1:
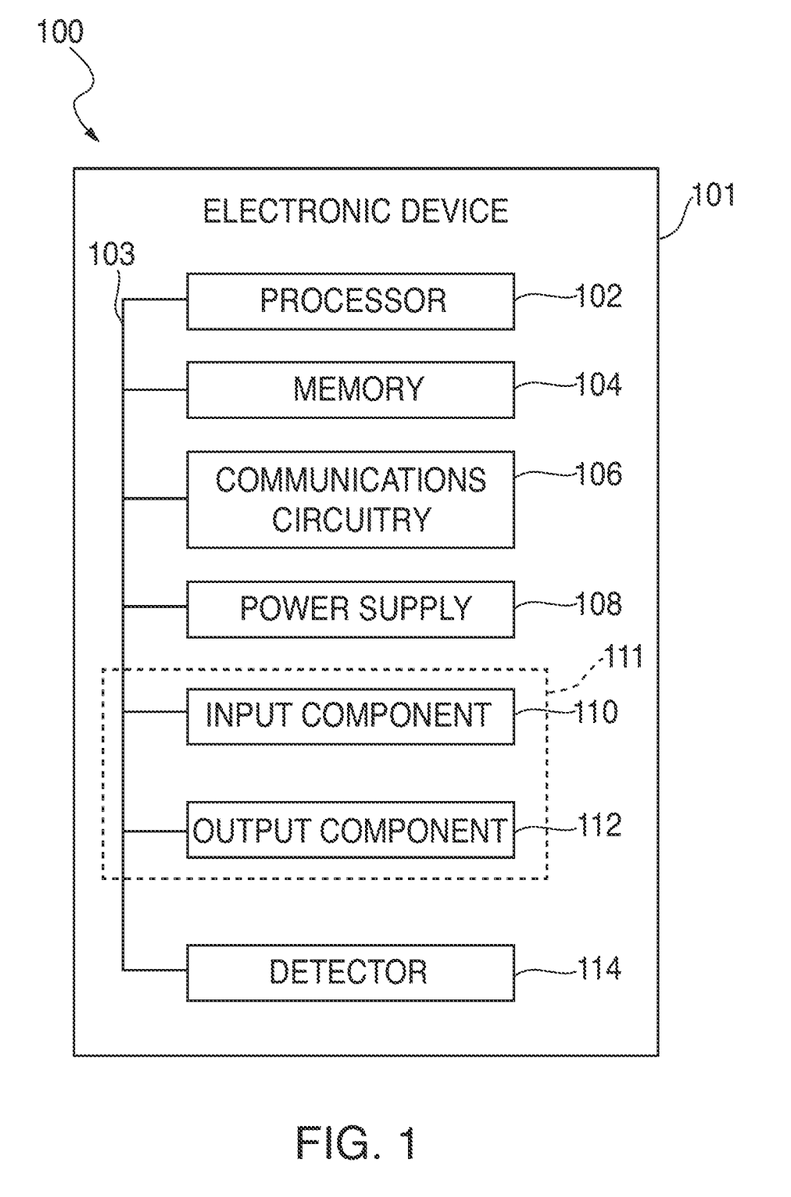
FIG. 1 is a schematic view of an illustrative electronic device, in accordance with at least one embodiment of the invention.

FIG. 1 is a schematic view of an illustrative electronic device 100 that may couple to and be used with a listening device by a user. In some embodiments, electronic device 100 may perform a single function (e.g., a device dedicated to storing image content) and, in other embodiments, electronic device 100 may perform multiple functions (e.g., a device that stores image content, plays music, and receives and transmits telephone calls). Moreover, in some embodiments, electronic device 100 may be any portable, mobile, or hand-held electronic device configured to control output of content. Alternatively, electronic device 100 may not be portable at all, but may instead be generally stationary. Electronic device 100 may include any suitable type of electronic device operative to control output of content. For example, electronic device 100 may include a media player (e.g., an iPod™ available by Apple Inc. of Cupertino, Calif.), a cellular telephone (e.g., an iPhone™ available by Apple Inc.), a personal e-mail or messaging device (e.g., a Blackberry™ available by Research In Motion Limited of Waterloo, Ontario), any other wireless communication device, a pocket-sized personal computer, a personal digital assistant ("PDA"), a tablet, a laptop computer, a desktop computer, a music recorder, a still camera, a movie or video camera or recorder, a radio, medical equipment, any other suitable type of electronic device, and any combinations thereof.

Electronic device 100 may include a processor or control circuitry 102, memory 104, communications circuitry 106, power supply 108, input component 110, output component 112, and a detector 114. Electronic device 100 may also include a bus 103 that may provide a transfer path for transferring data and/or power, to, from, or between various other components of device 100. In some embodiments, one or more components of electronic device 100 may be combined or omitted. Moreover, electronic device 100 may include other components not combined or included in FIG. 1. For example, electronic device 100 may include motion detection circuitry, light sensing circuitry, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the other components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, a microphone, and combinations thereof. For example, input component 110 may include a multi-touch screen. Each input component 110 can be configured to provide one or more dedicated control functions for making selections or issuing commands associated with operating device 100.

Electronic device 100 may also include one or more output components 112 that may present information (e.g., textual, graphical, audible, and/or tactile information) to a user of device 100. Output component 112 of electronic device 100 may take various forms, including, but not limited, to audio speakers, in-ear earphones, headphones, audio line-outs, visual displays, antennas, infrared ports, rumblers, vibrators, or combinations thereof.

For example, output component 112 of electronic device 100 may include an image display 112 as an output component. Such an output component display 112 may include any suitable type of display or interface for viewing image data captured by detector 114. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display.

In some embodiments, output component 112 may include an audio output module that may be coupled to an audio connector (e.g., a male audio jack) for interfacing with an audio device (e.g., a headphone, an in-ear earphone, a microphone, etc.).

It should be noted that one or more input components 110 and one or more output components 112 may sometimes be referred to collectively herein as an I/O interface (e.g., input component 110 and output component 112 as I/O interface 111). It should also be noted that input component 110 and output component 112 may sometimes be a single I/O component, such as a touch screen that may receive input information through a user's touch of a display screen and that may also provide visual information to a user via that same display screen.

Detector 114 may include one or more sensors of any suitable type that may capture human recognition data (e.g., face data) that may be utilized to detect the presence of one or more individuals. For example, detector 114 may include an image sensor and/or an infrared sensor. The image sensor may include one or more cameras with any suitable lens or number of lenses that may be operative to capture images of the surrounding environment of electronic device 100. For example, the image sensor may include any number of optical or digital lenses for capturing light reflected by the device's environment as an image. The captured light may be stored as an individual distinct image or as consecutive video frame images of a recording (e.g., several video frames including a primary frame and one or more subsequent frames that may indicate the difference between the primary frame and the subsequent frame). As used herein, the term "camera lens" may be understood to mean a lens for capturing light or a lens and appropriate circuitry for capturing and converting captured light into an image that can be analyzed or stored by electronic device 100 as either an individual distinct image or as one of many consecutive video frame images.

In some embodiments, detector 114 may also include one or more sensors that may detect any human feature or characteristic (e.g., physiological, psychological, physical, movement, etc.). For example, detector 114 may include a microphone for detecting voice signals from one or more individuals. As another example, detector 114 may include a heartbeat sensor for detecting heartbeats of one or more individuals. As yet other examples, detector 114 may include a fingerprint reader, an iris scanner, a retina scanner, a breath sampler, and a humidity sensor that may detect moisture and/or sweat emanating from any suitable portion of an individual's body. For example, detector 114 may include a humidity sensor that may be situated near or coupled to one or more portions of input component 110, and that may detect moisture and/or sweat from an individual's hands. It should be appreciated that any detector 114 may include any sensor that may detect any human feature or characteristic.

In some embodiments, detector 114 may also include positioning circuitry for determining a current position of device 100. The positioning circuitry may be operative to update the current position at any suitable rate, including at relatively high rates to provide an estimation of speed and distance traveled. In some embodiments, the positioning circuitry may include a global positioning system ("GPS") receiver for accessing a GPS application function call that may return geographic coordinates (i.e., a geographic location) of the device. The geographic coordinates may be fundamentally, alternatively, or additionally, derived from any suitable trilateration or triangulation technique. For example, the positioning circuitry may determine the current location of device 100 by using various measurements (e.g., signal-to-noise ratio ("SNR") or signal strength) of a network signal (e.g., a cellular telephone network signal) that may be associated with device 100. For example, a radio frequency ("RF") triangulation detector or sensor integrated with or connected to device 100 may determine the (e.g., approximate) current location of device 100. Device 100's current location may be determined based on various measurements of device 100's own network signal, such as, for example: (1) an angle of the signal's approach to or from one or more cellular towers, (2) an amount of time for the signal to reach one or more cellular towers or device 100, (3) the strength of the signal when it reaches one or more towers or device 100, or any combination of the aforementioned measurements. Other forms of wireless-assisted GPS (e.g., enhanced GPS or A-GPS) may also be used to determine the current position of device 100. Instead or in addition, the positioning circuitry may determine the current location of device 100 based on a wireless network or access point that may be in range or a wireless network or access point to which device 100 may be currently connected. For example, because wireless networks may have a finite range, a wireless network that may be in range of device 100 may indicate that device 100 is located in within a detectable vicinity of the wireless network. In some embodiments, device 100 may automatically connect to a wireless network that may be in range in order to receive valid modes of operation that may be associated or that may be available at the current position of device 100.

In some embodiments, detector 114 may also include motion sensing circuitry for detecting motion of an environment of device 100 and/or objects in the environment. For example, the motion sensing circuitry may detect a movement of an object (e.g., an individual) about device 100 and may generate one or more signals based on the detection.

Processor 102 of device 100 may control the operation of many functions and other circuitry provided by device 100. For example, processor 102 may receive input signals from input component 110 and/or drive output signals through display 112. Processor 102 may load a manager program (e.g., a program stored in memory 104 or another device or server accessible by device 100) to process or analyze data received via detector 114 or inputs received via input component 110 to control output of content that may be provided to the user via output component 112 (e.g., display 112). Processor 102 may associate different metadata with the human recognition data captured by detector 114, including, for example, positioning information, device movement information, a time code, a device identifier, or any other suitable metadata. Electronic device 100 (e.g., processor 102, any circuitry of detector 114, or any other component available to device 100) may be configured to capture data with detector 114 at various resolutions, frequencies, intensities, and various other characteristics as may be appropriate for the capabilities and resources of device 100.

Electronic device 100 may also be provided with a housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
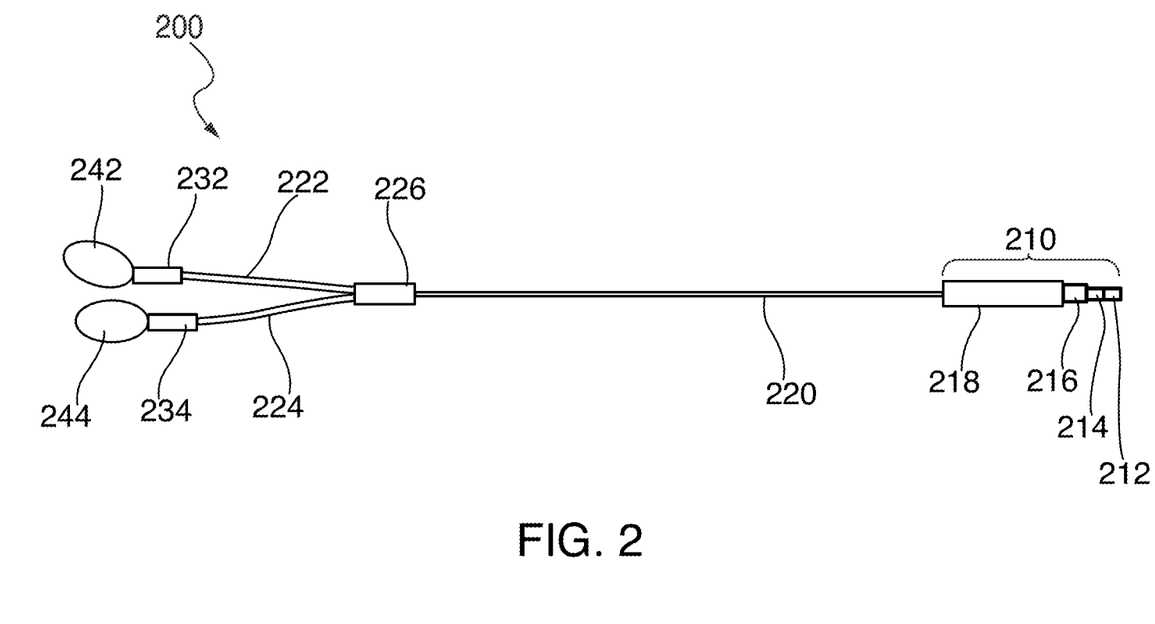
FIG. 2 shows an illustrative listening device that may couple to the electronic device of FIG. 1, in accordance with at least one embodiment of the invention.

FIG. 2 shows an illustrative listening device 200. Listening device 200 may be an in-ear earphone, and may be configured to couple to electronic device 100 (e.g., via output component 112), and may include a connector 210 (e.g., a male audio jack). Connector 210 may include a left channel contact 212, a right channel contact 214, a ground channel contact 216, and a shield 218. Listening device 200 may also include a main cable 220, which may include a left channel cable 222 and a right channel cable 224. Connector 210 may be coupled to main cable 220 within shield 218. For example, left channel contact 212 may be coupled to left channel cable 222 and right channel contact 214 may be coupled to right channel cable 224. A first portion of left channel cable 222 and a first portion of right channel cable 224 may be joined within or to form main cable 220, yet may still be electrically isolated from each other. Further, a second portion of left channel cable 222 and a second portion of right channel cable 224 may be separated (e.g., physically and/or electrically) via a splitter component 226 (which, in some embodiments, may not be included as part of listening device 200). Left channel cable 222 may be coupled to a left earbud 242, and right channel cable 224 may be coupled to a right earbud 244. Listening device 200 may also include strain relief 232 disposed around a portion of left channel cable 222, that may be coupled to left earbud 242, so as to provide structural support (e.g., to prevent damage due to bending) to that portion of left channel cable 222. Listening device 200 may also include strain relief 234 disposed around a portion of right channel cable 224, that may be coupled to right earbud 244, so as to provide structural support to that portion of right channel cable 224. In some embodiments, listening device 200 may have a length of approximately 3.5 feet from end-to-end (e.g., from connector 210 to left and/or right earbuds 242 and 244).

Although FIG. 2 may show listening device as an in-ear earphone, it should be appreciated that a headphone or any other suitable type of listening device may be configured with a similar connector, cables, etc.

Figure 3:
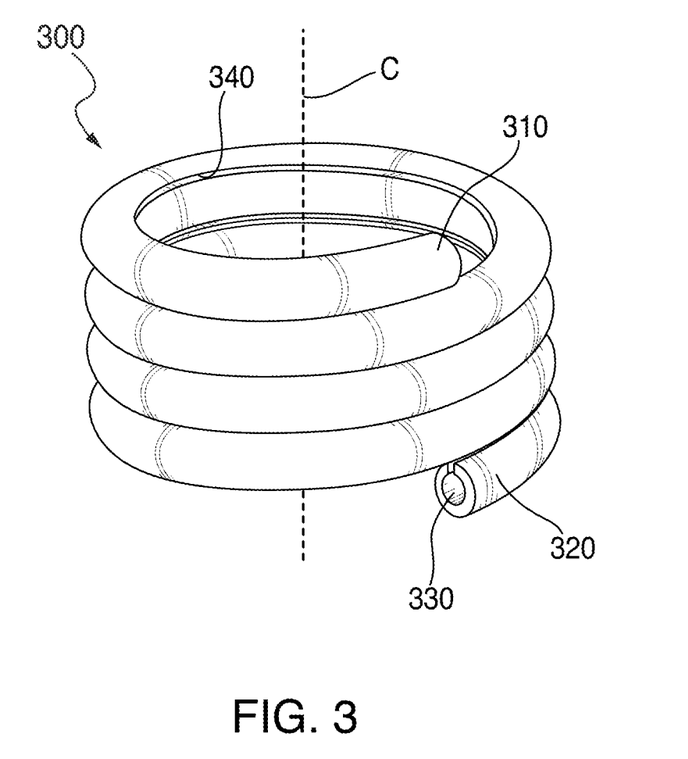
FIG. 3 shows an illustrative casing in a first state, in accordance with at least one embodiment of the invention.
Figure 4:
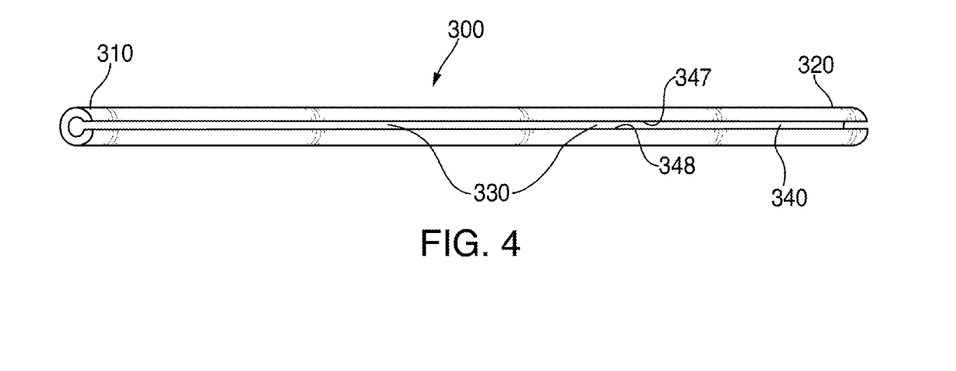
FIG. 4 shows the casing of FIG. 3 in a second state, in accordance with at least one embodiment of the invention.

FIG. 3 shows an illustrative casing 300, in a first state, that may store listening device 200. Casing 300 may have a tube-like shape, and may be configured to naturally coil up or self-coil. As shown in FIG. 3, casing 300 may self-coil in a spring-like, non-tangled manner or configuration. That is, no portion of casing 300 tangles or forms a knot with another portion of casing 300. In such a non-tangled configuration, casing 300 may be easily uncoiled when a force is applied (e.g., by a user) to casing 300. Casing 300 may be composed of any suitable type of material (e.g., TPU, elastomer, silicone, plastic, etc.) that may stretch and/or straighten out when the force is applied to uncoil casing 300. As shown in FIG. 4, casing 300 may uncoil (e.g., to a stretched and/or straightened state) when the force is applied to uncoil casing 300. Casing 300 may include a first end 310 and a second end 320, and the force may include a user holding first end 310 with one hand and holding second end 320 with another hand (e.g., with second end 320 being positioned as far away from first end 310 as possible). For example, such a force may be applied by a user holding and moving first end 310 and second end 320 away from each other until casing 300 uncoils a suitable amount. As another example, such a force may be applied by a user gripping onto any suitable portions of casing 300 using two hands, and moving the two hands away from each other until casing 300 uncoils a suitable amount.

Casing 300 may also include a longitudinal retaining cavity 330 that may extend from first end 310 to second end 320. Casing 300 may include a channel 340, that may lead to retaining cavity 330, for insertion of a listening device (e.g., listening device 200). When casing 300 is configured in a coiled state (e.g., as shown in FIG. 3), channel 340 may be disposed within a perimeter of coiled casing 300 (e.g., closer towards center point C of coiled casing 300). In this manner, at least a portion of a listening device (e.g., listening device 200) may be stored or encased within retaining cavity 330 of casing 300.

In some embodiments, one or more of first end 310 and second end 320 may include protrusions, bulges, handles, or any other physical structure(s) (not shown) that may assist a user in gripping or holding casing 300 prior to, during, and/or after uncoiling of casing 300.

It should be appreciated that casing 300 may also store any other suitable device that may tangle and/or knot (e.g., a power cable, a communication cable, etc.).

Figure 3A:
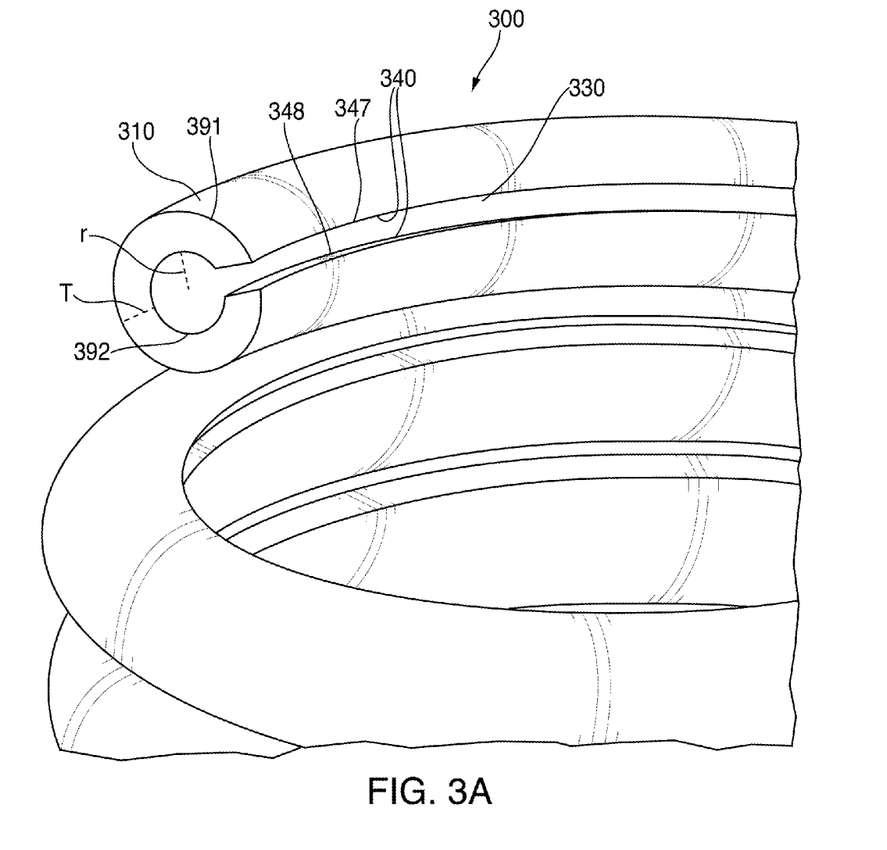
FIG. 3A is a magnified view of a portion of the casing of FIG. 3, in accordance with at least one embodiment of the invention.

FIG. 3A is a magnified view of a portion of casing 300. As described above, casing 300 may have a tube-like shape. In particular, casing 300 may include a curved outer surface 391, a curved inner surface 392, a thickness T, and a retaining cavity 330 radius r. The various physical dimensions of casing 300 may be configured based on, for example, dimensions of suitable devices that casing 300 may store.

To store listening device 200 into casing 300, force may need to be applied to various portions of casing 300. For example, when a force is applied to move portion 347 of casing 300 away from portion 348 of casing 300, channel 340 may become larger and portions of a listening device may be insertable through channel 340 and into retaining cavity 330. Although FIGS. 3 and 3A may show retaining cavity 330 being circular or cylindrical in shape, retaining cavity 330 may also be configured to exhibit any other suitable shape (e.g., square, a shape having sharp edges, etc.).

FIG. 4 shows casing 300 in an uncoiled (e.g., straightened) state. For example, casing 300 may be held in an uncoiled state by one or more forces (e.g., by a user holding onto first end 310 and separating second end 320 from first end 310 until casing 300 is substantially flat or straight). A listening device cable (e.g., main cable 220) may be subsequently inserted through channel 340 into retaining cavity 330. For example, a user may gradually insert main cable 220 starting from a portion of channel 340 at or near first end 310 to a portion of channel 340 at or near second end 320.

Casing 300 may be configured such that, while each portion of main cable 220 is inserted through channel 340 into retaining cavity 330, corresponding portions of casing 300 (e.g., portions 347 and 348) may be at least partially separated from each other so as to allow insertion of main cable 220. After such a portion of main cable 220 is inserted into retaining cavity 330, the corresponding portions of casing 300 (e.g., portions 347 and 348) may at least partially retract back towards each other to store or encase the inserted portion of main cable 220. When a user release some or all of the force required to uncoil casing 300, casing 300 may self-coil up (e.g., as shown in FIG. 3).

Figure 5:
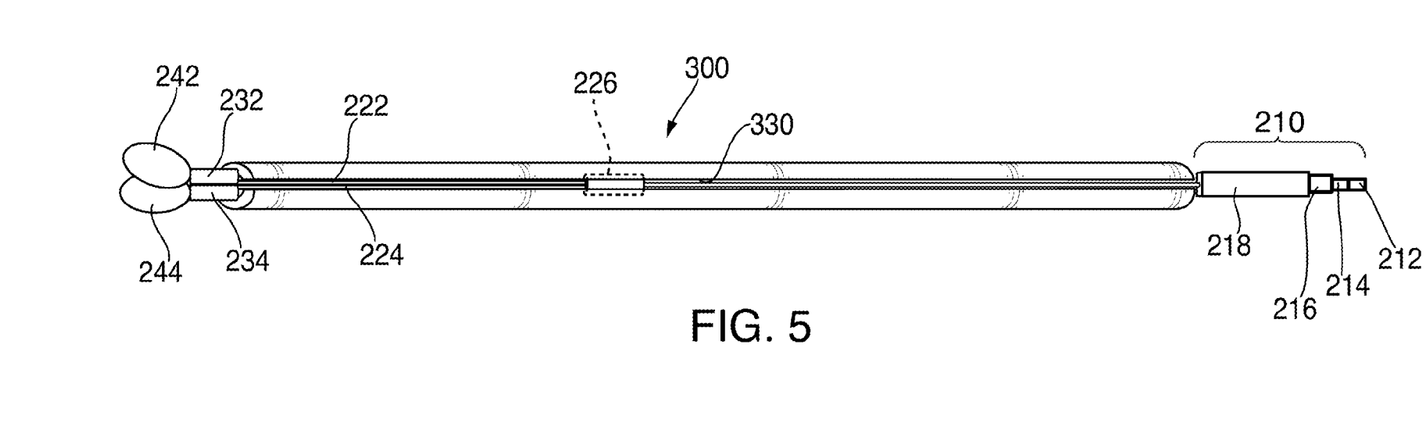
FIG. 5 shows the listening device of FIG. 2 being stored in the casing of FIG. 3 in the second state, in accordance with at least one embodiment of the invention.

FIG. 5 shows listening device 200 being stored in casing 300 in an uncoiled state. Left channel cable 222, right channel cable 224, and main cable 220 may be fully (or near fully) inserted within retaining cavity 330 of casing 300. When left channel cable 222, right channel cable 224, and main cable 220 are inserted within retaining cavity 330, left earbud 242, right earbud 244, and connector 210 may or may not be fully inserted within retaining cavity 330. For example, one or more of left earbud 242, right earbud 244, and connector 210 may be disposed outside of retaining cavity 330 (and thus, may not be stored in casing 300).

In some embodiments, each of strain reliefs 232 and 234 may be completely stored in retaining cavity 330 (e.g., as shown in FIG. 5). In other embodiments, each of strain reliefs 232 and 234 may instead be disposed outside of retaining cavity 330. For example, the entireties of strain reliefs 232 and 234 may be disposed outside of retaining cavity 330. As another example, a portion of each of strain reliefs 232 and 234 may be disposed outside of retaining cavity 330, while remaining portions of each of strain reliefs 232 and 234 may be stored in casing 300.

Figure 6:
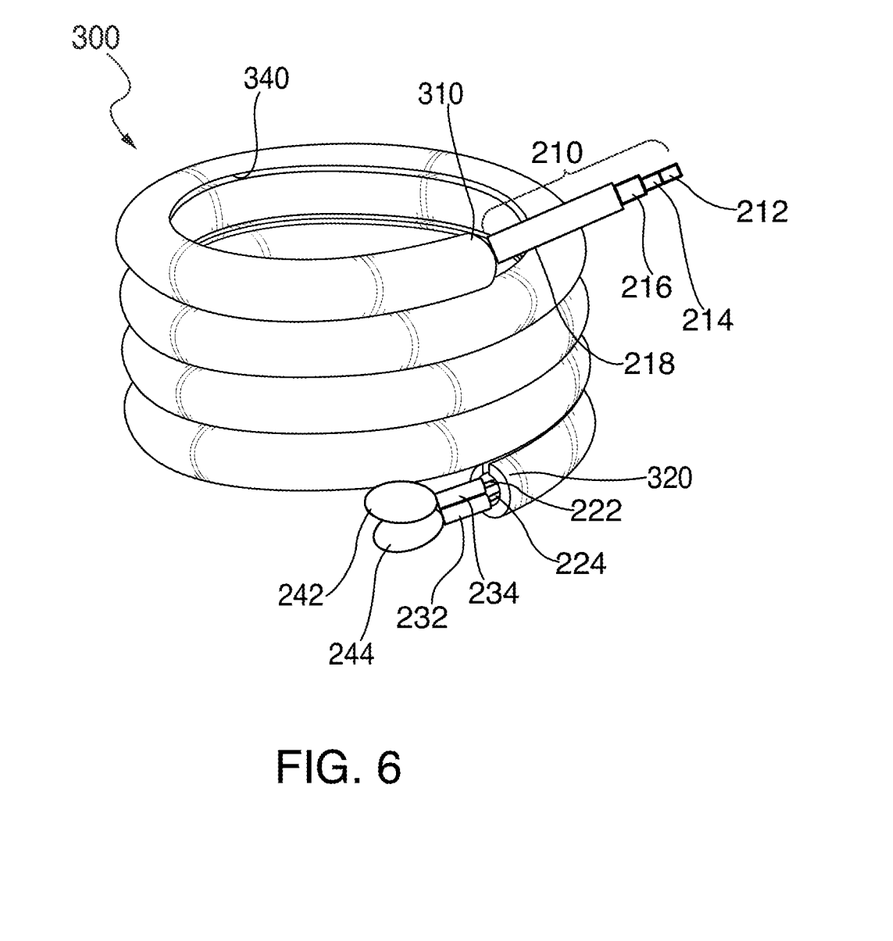
FIG. 6 shows the listening device of FIG. 2 being stored in the casing of FIG. 4 in the first state, in accordance with at least one embodiment of the invention.

FIG. 6 shows listening device 200 encased within casing 300 in a coiled state. The coiled state may be a natural or relaxed state of casing 300 when no force is applied to casing 300. As shown in FIG. 6, casing 300 may self-coil in a spring-like, non-tangled manner or configuration, and thus wrap or encase listening device 200 in the non-tangled manner. That is, no portion of casing 300 tangles or forms a knot with another portion of casing 300, and thus, no portion of listening device 200 tangles or forms a knot with another portion of listening device 200. In such a non-tangled configuration, casing 300 (and thus, listening device 200) may be easily uncoiled when a force is applied (e.g., by a user) to casing 300.

Listening device 200 may be employed (e.g., coupled to electronic device 100) while being stored in casing 300. For example, a user may couple connector 210 to electronic device 100, and may remove some or all of left channel cable 222 and right channel cable 224 from casing 300 so as to allow farther separation of left earbud 242 from right earbud 244. The user may then at least partially uncoil casing 300 such that left earbud 242 and right earbud 244 may be brought near and into respective ears of the user.

Figure 7A:
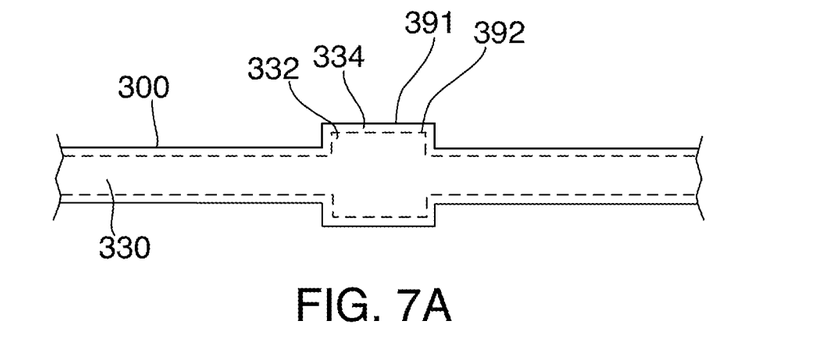
FIG. 7A shows a portion of the casing of FIG. 3 having an alternative configuration, in accordance with at least one embodiment of the invention.

Although FIGS. 3-6 may show casing 300 having a uniform size throughout its longitudinal length, one or more sections of casing 300 may be larger than others. FIG. 7A shows a section of casing 300 having an alternative configuration. As shown in FIG. 7A, the alternative configuration may include a bulge 332 in curved inner surface 392 of retaining cavity 330, as well as a bulge 334 in curved outer surface 391 of casing 300. Bulges 332 and 334 may allow portions of listening device 200 that may be larger than other portions of listening device 200 to fit into casing 300 (e.g., a microphone component of listening device (not shown); that may be included along main cable 220, and that may be relatively larger compared to a thickness of main cable 220; and/or splitter component 226 that may be relatively larger compared to the thickness of main cable 220). In some embodiments, bulges 332 and 334 may also serve as a guide for a user when inserting and storing listening device 200 into casing 300 (e.g., that splitter component 226 should be aligned with bulges 332 and 334). It should be appreciated that a plurality of bulges similar to bulges 332 and 334 may be configured throughout any suitable portion of casing 300.

Figure 7B:
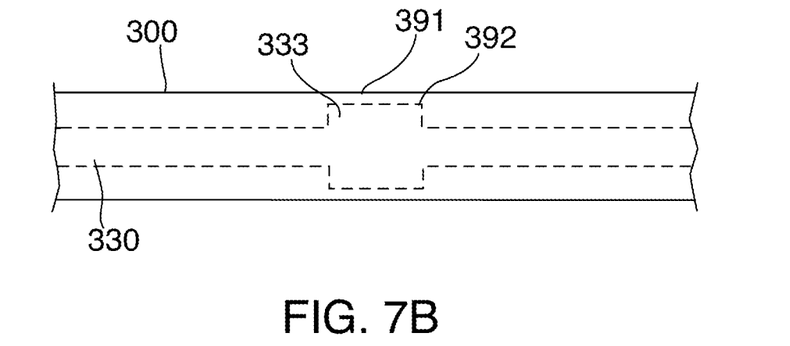
FIG. 7B shows a portion of the casing of FIG. 3 having another alternative configuration, in accordance with at least one embodiment of the invention.

Because bulges 332 and 334 may not be physically appealing to a user, casing 300 may be alternatively configured to only include a bulge in curved inner surface 392 of retaining cavity 330. FIG. 7B shows a section of casing 300 having another alternative configuration. As shown in FIG. 7B, this alternative configuration may only include a bulge 333 in curved inner surface 392 of retaining cavity 330, with curved outer surface 391 of casing 300 being substantially uniform (e.g., bulge-less) throughout the longitudinal length of casing 300. In this manner, one or more larger components of listening device 200 (e.g., splitter component 226) may still fit in casing 300 (e.g., within bulge 333 and/or any other similar bulges of casing 300), without affecting a physical outer appearance of casing 300. In this alternative configuration, it should be appreciated that an overall thickness of casing 300 (e.g., thickness T and/or radius r) may need to be larger than that for the alternative configuration shown in FIG. 7A.

Figure 8:
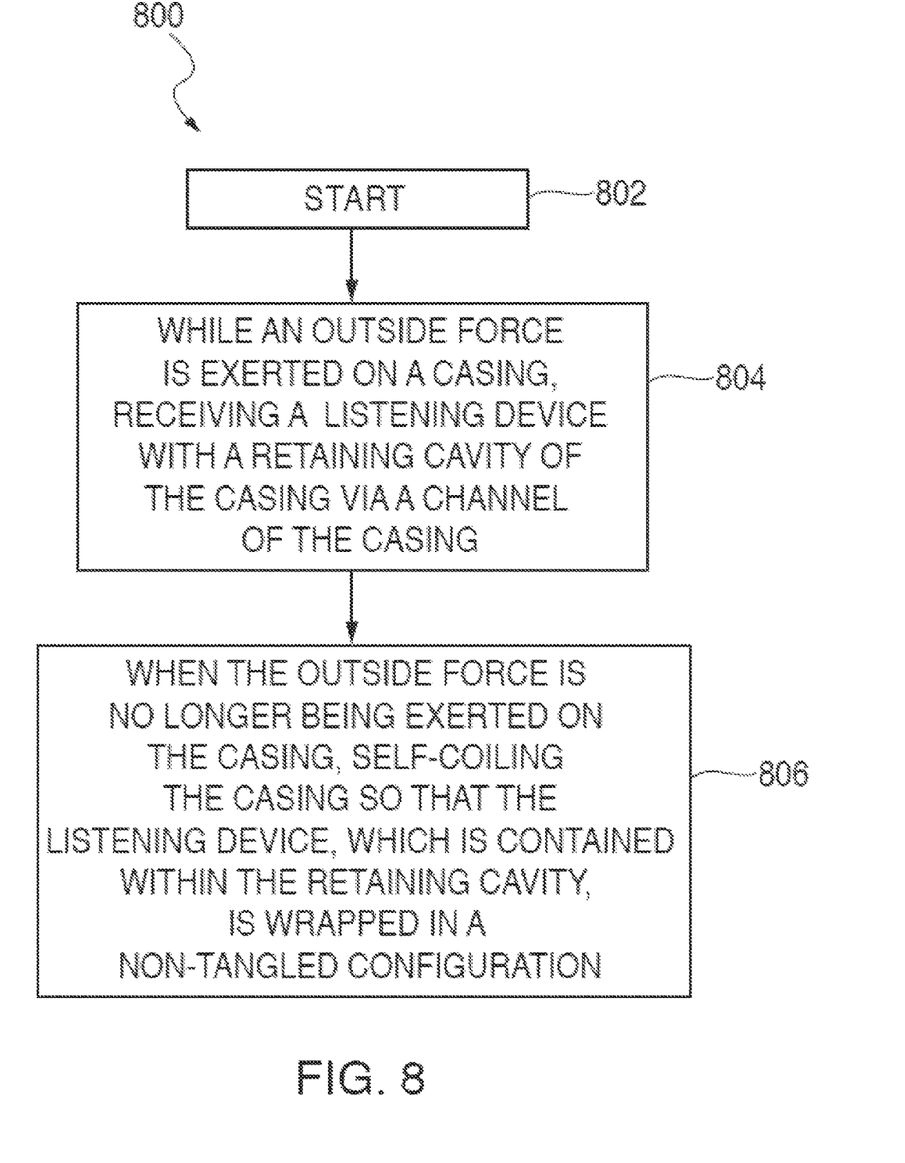
FIG. 8 is a flowchart of an illustrative process for storing the listening device of FIG. 2 using the casing of FIG. 3, in accordance with at least one embodiment of the invention.

FIG. 8 shows an illustrative process for storing a cable (e.g., listening device 200) in casing 300. Process 800 may begin at step 802. At step 804, the process may include, while an outside force is exerted on the casing, receiving a cable with a retaining cavity of a casing via a channel of the casing. For example, the process may include, while an outside force is exerted on casing 300 (e.g., to substantially uncoil casing 300), receiving listening device 200 with retaining cavity 330 of casing 300 via channel 340 of casing 300. In particular, a portion of left channel cable 222 (e.g., that may be adjacent to strain relief 232) and a portion of right channel cable 224 (e.g., that may be adjacent to strain relief 234) may be received via channel 340 (e.g., at or near first end 310 of casing 300) into retaining cavity 330. For example, the process may include first aligning these portions of left and right channel cables 222 and 224 in parallel with a longitudinal section of an uncoiled (or at least partially uncoiled) casing 300, prior to the disposing or inserting thereof into retaining cavity 330 (see, e.g., FIG. 5).

At step 806, the process may include, when the outside force is no longer being exerted on the casing, self-coiling the casing so that the cable, which is contained within the retaining cavity, is wrapped in a non-tangled configuration. For example, the process may include, when the outside force is no longer being exerted on casing 300, self-coiling casing 300 so that listening device 200, which is contained within retaining cavity 330, is wrapped in a non-tangled configuration. As shown in FIG. 6, for example, casing 300 may wrap listening device 200 in a non-tangled configuration when no outside force is being applied to casing 300.

It is to be understood that the steps shown in process 800 of FIG. 8 are merely illustrative and that existing steps may be modified or omitted, additional steps may be added, and the order of certain steps may be altered.

While there have been described systems and methods for storing a listening device using a casing, it is to be understood that many changes may be made therein without departing from the spirit and scope of the invention. Those skilled in the art will appreciate that the invention can be practiced by other than the described embodiments, which are presented for purposes of illustration rather than of limitation, and the invention is limited only by the claims which follow.

What is claimed is:

1. For storing a cable, a casing comprising:
a self-coiling structure having a predetermined length and comprising a curved outer surface, a retaining cavity, and a channel, the retaining cavity and the channel being adjacent to each other and extending along the predetermined length, and the channel being operative to enable the cable ingress to and egress from the retaining cavity; wherein the casing is operative to:
self-coil in the absence of an externally applied force; and
uncoil when subjected to an externally applied force, and wherein the size of the retaining cavity varies throughout the predetermined length of the structure.

2. The casing of claim 1, wherein the retaining cavity has a predetermined radius.

3. The casing of claim 1, wherein the size of the curved outer surface is the same throughout the predetermined length of the structure.

4. The casing of claim 1, wherein the size of the curved outer surface varies throughout the predetermined length of the structure.

5. The casing of claim 1, wherein a cross-sectional area of the retaining cavity is greater than a cross-sectional area of the channel.

6. The casing of claim 1, wherein the retaining cavity has a square cross-section.

7. The casing of claim 1, wherein the casing is operative to self-coil, while containing the cable in the retaining cavity, in the absence of the externally applied force.

8. A casing for storing a cable comprising:
a curved outer surface; and
a longitudinal cavity for storing at least one component of the cable, wherein:
the longitudinal cavity forms an inner surface of the casing;
the casing is:
at least partially coiled when no external force is applied to the casing; and
at least partially straight when the external force is applied to the casing;
the longitudinal cavity comprises a first cross-sectional area at a first portion of the casing;
the longitudinal cavity comprises a second cross-sectional area at a second portion of the casing; and
the first cross-sectional area is larger than the second cross-sectional area.

9. The casing of claim 8, wherein the cable comprises a listening device.

10. The casing of claim 9, wherein the listening device comprises one of a headphone and an in-ear earphone.

11. The casing of claim 8, wherein the inner surface comprises a curve.

12. The casing of claim 8, wherein the inner surface comprises at least one edge.

13. A casing of for storing a cable comprising:
a curved outer surface; and
a longitudinal cavity for storing at least one component of the cable, wherein:
the longitudinal cavity forms an inner surface of the casing;
the casing is:
at least partially coiled when no external force is applied to the casing;
at least partially straight when the external force is applied to the casing; and
the curved outer surface comprises at least one protrusion for storing a particular component of the cable.

14. The casing of claim 13, wherein the particular component comprises at least one of a cable splitting component and a microphone.

15. The casing of claim 1, wherein the retaining cavity comprises a bulge throughout a particular portion of the predetermined length of the structure.

16. The casing of claim 15, wherein the curved outer surface comprises an outer bulge throughout at least a portion of the particular portion of the predetermined length of the structure.

17. The casing of claim 15, wherein the curved outer surface is uniform throughout the predetermined length of the structure.

18. The casing of claim 8, wherein:
the first portion of the casing is for storing a first portion of the cable;
the second portion of the casing is for storing a second portion of the cable; and
the first portion of the cable has a larger cross-section than the second portion of the cable.

19. The casing of claim 8, wherein:
the first portion of the cable comprises at least one of a cable splitting component and a microphone; and
the second portion of the cable comprises a channel cable portion.

20. The casing of claim 8, wherein:
the longitudinal cavity comprises a third cross-sectional area at a third portion of the casing;
the first portion of the casing is between the second portion of the casing and the third portion of the casing along the length of the casing; and
the third cross-sectional area is the same as the second cross-sectional area.

21. The casing of claim 8, wherein:
the curved outer surface comprises a third cross-sectional area at the first portion of the casing;
the curved outer surface comprises a fourth cross-sectional area at the second portion of the casing; and
the third cross-sectional area is the same as the fourth cross-sectional area.

22. The casing of claim 8, wherein:
the curved outer surface comprises a third cross-sectional area at the first portion of the casing;
the curved outer surface comprises a fourth cross-sectional area at the second portion of the casing; and
the third cross-sectional area is larger than the fourth cross-sectional area.

* * * * *